United States Patent [19]

Fike et al.

[11] 4,245,247
[45] Jan. 13, 1981

[54] HARD COPY REPRODUCTION FROM VIDEO DISC INFORMATION

[75] Inventors: Bruce G. Fike, Rochester; Dennis G. Howe, Fairport; Evan A. Edwards, Pittsford, all of N.Y.

[73] Assignee: Eastman Kodak Company, Rochester, N.Y.

[21] Appl. No.: 58,990

[22] Filed: Jul. 19, 1979

Related U.S. Application Data

[62] Division of Ser. No. 918,875, Jun. 26, 1978.

[51] Int. Cl.³ .......................................... H04N 1/26
[52] U.S. Cl. ............................ 358/128.6; 358/296
[58] Field of Search ................... 360/33, 35, 10; 358/128.5, 128.6, 296, 127, 302, 131, 140; 179/100.1 G, 100.3 B, 100.3 V

[56] References Cited

U.S. PATENT DOCUMENTS

| | | | |
|---|---|---|---|
| 4,000,510 | 12/1976 | Cheney et al. | 360/33 |
| 4,013,876 | 3/1977 | Anstin | 358/302 X |
| 4,015,289 | 3/1977 | Kinjo et al. | 358/128.6 |
| 4,064,538 | 12/1977 | Broussaud | 358/128.6 |
| 4,138,741 | 2/1979 | Hedlund et al. | 358/128.5 |
| 4,167,024 | 9/1979 | Hamisch | 179/100.1 G |

Primary Examiner—Raymond F. Cardillo, Jr.
Assistant Examiner—Donald McElheny, Jr.
Attorney, Agent, or Firm—Donald W. Strickland

[57] ABSTRACT

Facsimile recording on a video disc, wherein a document such as a bank check is recorded as a frame of video information, generally requires that the frame of recorded information be displayed or transformed into a hard copy reproduction of the original document. In accordance with a presently preferred embodiment of the invention, the frame of video information is recorded on a video disc as two fields of interlaced lines recorded on adjacent circular tracks. Upon playback, the circular tracks are alternately read to produce the customary video display of two interlaced fields. To provide a hard copy reproduction of the original document, the circular tracks are simultaneously read and the resultant signal fed to a signal processing circuit. The output of the signal processing circuit comprises, in alternation, lines of video information from each field. This output signal is fed to a printer device which prints, line-by-line, a hard copy reproduction of the original document.

6 Claims, 9 Drawing Figures

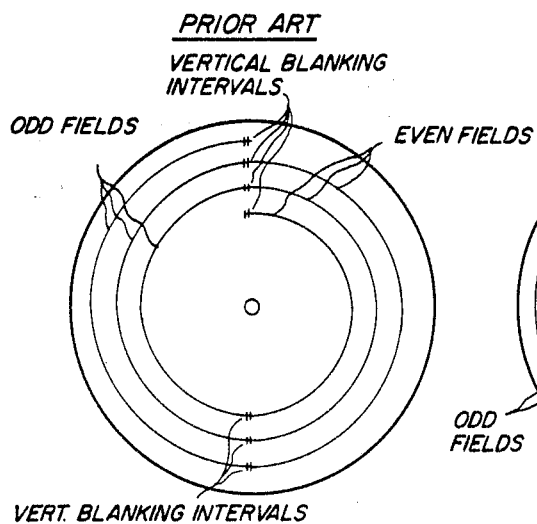
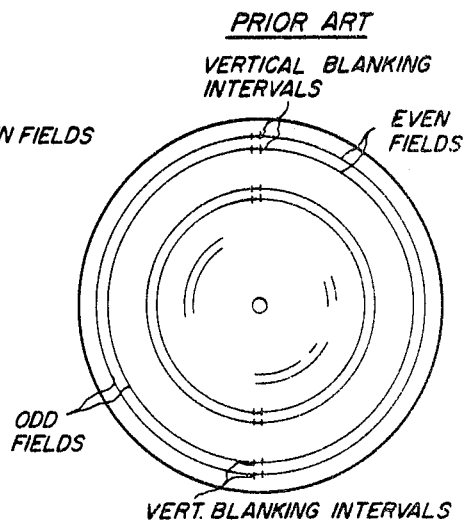
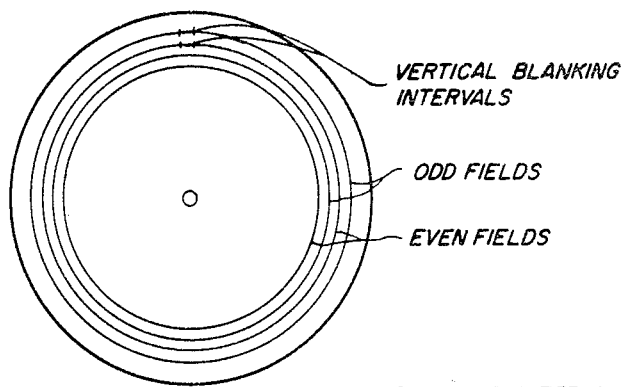
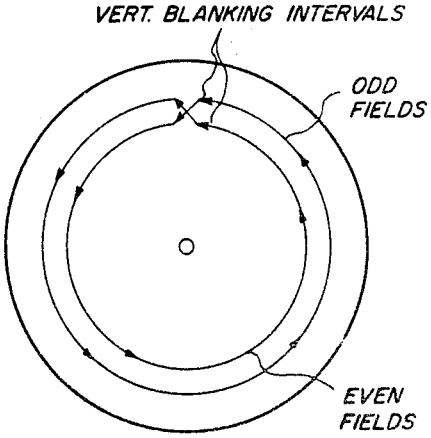

|  | TERMINAL | | | | |
| TIME | 10 | 20 | 30 | 40 | 50 |
| --- | --- | --- | --- | --- | --- |
| 0-τ | 1 | — | — | — | — |
| τ-2τ | 1 | 2 | — | — | — |
| 2τ-3τ | 3 | 2 | 1 | — | 1 |
| 3τ-4τ | 3 | 4 | — | 2 | 2 |
| 4τ-5τ | 5 | 4 | 3 | — | 3 |
| 5τ 6τ | 5 | 6 | — | 4 | 4 |

HARD COPY REPRODUCTION FROM VIDEO DISC INFORMATION

This is a division of application Ser. No. 918,875, filed June 26, 1978.

BACKGROUND OF THE INVENTION

1. Field of the Invention

The present invention relates to the storage of document information on a video disc and, more particularly, to a video disc and apparatus for providing hard copy reproduction of stored document information.

2. Description Relative to the Prior Art

It is generally known in the art to record video program material, on a video disc, according to a circular or spiral record track configuration with one frame being recorded per disc revolution. During recording and playback, the disc spins at a rate corresponding to the TV frame repetition rate which, in the United States, is 1800 per minute. Such recording configurations provide satisfactory results when recording subject matter having a large number of sequential frames, such as in a typical video program. For these applications, a spiral record track is most common. Suitable playback optics track the spiral record track in order to reproduce the thousands of frames which constitute the program material. A circular record track configuration can also be used in the recording of video program material, but such configuration suffers from the disadvantage that the playback optics must "step" from track to track during recording and playback. Such stepping is usually accomplished during the vertical blanking interval to avoid interference with the recorded program material.

Video discs are becoming increasingly important in applications involving the storage of document information (hereinafter sometimes called "document storage") because discs offer several advantages over microfilm systems. Assuming that each document, for example a bank check, is recorded as one 525-line frame of video information, present video technology potentially allows 54,000 documents to be stored on one side of a twelve inch diameter video disc (i.e. when one 525-line frame corresponds to one revolution of the disc). Further, because video discs are optically scanned, a random access system is practical wherein any one of the 54,000 documents stored on the disc could be located and displayed in seconds. It is apparent that the video disc represents a potentially valuable medium for document storage applications.

There are certain problems peculiar to document storage, however, which inhibit the application of video discs in this field. The resolution requirements for document storage applications are significantly greater than the already stringent requirements for conventional program material such as movies, etc. This more stringent resolution requirement is the result of having to be able to clearly discern each letter, number, symbol, etc., on the stored document. For example, if the stored document is a bank check, it is necessary to be able to read clearly not only the amount of the check and the signature, but also the account number (which frequently includes symbols) and the bank number. To complicate matters, many of the letter, numbers and symbols are similar in appearance.

Another problem involved in document storage on a disc is that it is often desired to make a hard copy reproduction of the stored document. A displayed video frame generally comprises two interlaced fields, yet the fields are recorded sequentially on the disc, i.e., field one is recorded and then field two is recorded. Upon playback through a video monitor, therefore, field one is reproduced and then field two. Most printers, however, print line-by-line starting at the top of the page and proceeding to the bottom. It would require substantial modification to the printer to make it compatible with a field sequential reproduction format. At the very least, the printer would have to be modified to start at the top of a page and print the lines of field one (lines 1, 3, 5 . . .) ending at the bottom of the page, and then return to the top of the page and print the lines of field two (lines 2, 4, 6 . . .) properly interlaced with those of field one. Such action would probably seriously impair the production rate (documents/hour) of the printer.

SUMMARY OF THE INVENTION

The present invention provides a system for storing document information on a record device in a manner having sufficient resolution to enable the document information, when reproduced, to be clearly recognized. The particular recording format empolyed allows a single frame of document information (which corresponds to one document) to be continuously displayed on a cathode ray tube, or reproduced in hard copy. In making a hard copy reproduction of the document, modifications to the printer are avoided by so reading the record device and processing the resultant signal that the signal is compatible with a conventional line-by-line printer. In a presently preferred embodiment, a document to be stored is recorded on a record device as one frame of information comprising two fields. The two fields are recorded on adjacent circular tracks of the record device, one field per disc revolution. For video display, a playback system alternately reads the circular tracks to produce, in order, the two fields of video information. To provide a hard copy reproduction of the original document, the two fields are read from the video disc simultaneously and the resultant signal is applied to a signal processing circuit. The processing circuit, in a manner described below, produces an output signal comprising, in alternation, lines of video information from the two fields, i.e., line one (field one), line two (field two), line three (field one), line four (field two) . . . . This output signal is fed to a printer device which prints, line-by-line, a hard copy reproduction of the stored document.

BRIEF DESCRIPTION OF THE DRAWINGS

In the detailed description of the preferred embodiments of the invention presented below, reference is made to the accompanying drawings, in which:

FIGS. 1a and 1b show prior art video disc recording configurations;

FIG. 2 shows a recording configuration in accordance with the present invention;

FIG. 3 shows the recording configuration of FIG. 2 adapted for document storage;

FIG. 4 is a diagram illustrating one form of readout of a video disc;

DETAILED DESCRIPTION OF THE DRAWINGS

Figure 5:
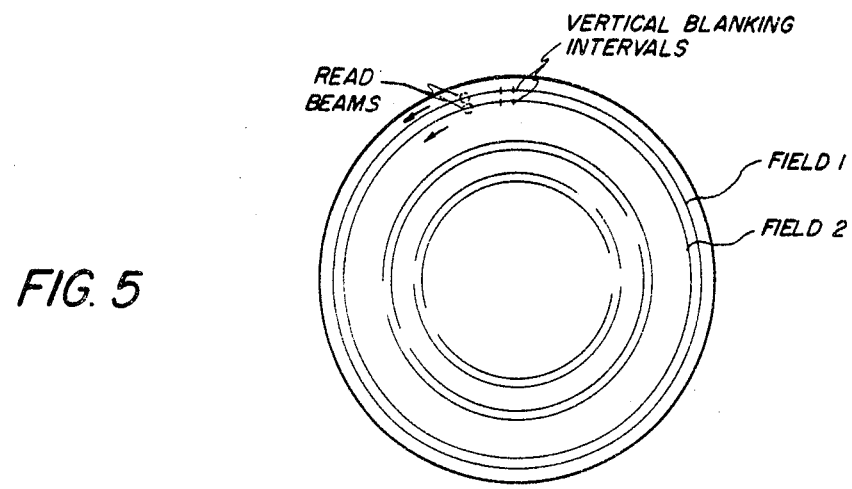
FIG. 5 is a diagram illustrating the read-out of a video disc for hard copy reproduction.

FIGS. 1a and 1b show prior art formats for recording video information on a video disc. In FIG. 1a, the video information is recorded in the form of a spiral track having one frame of video information recorded per disc revolution. Assuming that a document is recorded as one frame, as many documents can be recorded as there are disc revolutions in the spiral track. Each frame of video information is broken down into two fields, designated an odd field and an even field. The odd field contains the odd frame lines 1, 3, 5 ... and the even field contains the even frame lines 2, 4, 6 .... It is common practice to transmit the two fields sequentially in a form compatible with commercial television. For a typical frame, the positions on the disc at which the fields are recorded are shown in FIG. 1a. It will be noted that successive fields are separated by a vertical blanking interval.

An alternate recording configuration using circular record tracks is shown in FIG. 1b. One frame is recorded per disc revolution on a circular track with the recorded positions of the two fields and the vertical blanking intervals being as shown in FIG. 1b.

If one attempts to employ the above record track configurations in a document storage system, certain problems occur. First, recording one frame of video information per disc revolution has been found to provide insufficient resolution for document storage applications, at least when 12" diameter discs are used. As stated above, higher resolution is required for a document storage system because it is necessary to be able to recognize with certainty each letter, number or symbol which appears in the original document. Further, such characters preferably should be easily recognizable to facilitate readout of the stored information. As an example, if the pages of an encyclopedia are stored on a record device such as a video disc, upon readout the pages should not be "just readable" but, rather, "easily readable" to reduce eye strain, etc.

Another problem which arises in connection with using the record track configurations shown in FIGS. 1a and 1b in document storage systems is one of incompatibility with certain types of printers. A common type of printer is a line-by-line printer which starts at the top of a page and prints, in sequence, lines of document information and finishes at the bottom of the page. If one employs either of the record configurations discussed above, a playback system which tracks these spiral or circular record tracks would provide information from the first field to the printer device, and then information from the second field. As a result, the printer cannot print line-by-line, i.e., line 1, line 2, line 3 ... since the printer is receiving all of the lines from field 1 (lines 1, 3, 5 ...) before receiving any of the lines from field 2 (lines 2, 4, 6 ...).

In accordance with the present invention, a frame of video information representing a document is recorded as two fields of video information on adjacent circular tracks; see FIG. 2. It is important to note that one field is recorded per disc revolution rather than one frame. Because a field is recorded for one disc revolution, the resolution is doubled, thereby providing a higher resolution document storage system. Because a field is recorded per disc revolution, one frame of video information takes up two tracks as shown in FIG. 2. As a result, in accordance with the invention, certain modifications are made to the playback system to provide "hard copy" readout of the video disc.

Referring to FIG. 3, a video disc is shown having document information stored thereon according to the record configuration described above in connection with with FIG. 2. Each "page" of the stored document is recorded on a pair of circular tracks, one field per track. A guard band approximately equal in width to twice the track spacing is provided between each separate "page". As an example, the circular tracks may be 1 micron in width and spaced apart by 2 microns. Since the track lengths are less at smaller radial positions, a lower limit—which depends upon the resolution requirements of the system—is placed upon the minimum radius at which information can be recorded. It has been found that when storing pages of written text, recording can take place at a minimum disc radius of about 70 mm. Such a disc, therefore, has a track width of 1 micron, track-to-track spacing of 2 microns, and recorded information extending from a diameter of 70 mm to the outer radius, say, 140 mm, thereby enabling one to store about 17,500 pages of document information on one side of the disc.

An index is recorded near the center of the disc as shown in FIG. 3. Page numbers or check identification numbers, and associated image track address information, for example, are recorded in the index band of the disc. When it is desired to recover a particular page or check image, the index recording is scanned in a fraction of a second to determine the track where the image is located. The playback system then moves to a particular position on the disc which coincides, within one revolution of uncertainty, with the beginning of the desired image. Seventeen thousand documents can be indexed in this manner in about twenty revolutions of index information. Thus, the entire index record can be searched for a particular page ... that page located and played back ... and all within seconds. In contrast, if the page were to be located by scanning the recorded documents (on the disc) page-by-page, it would take several minutes, even at an increased disc rotation. It is to be noted that the index recording appears at an inner radius (as opposed to at a radius about equal to the disc radius), this being to protect the index recording from handling. It is possible to record the index information at small disc radii because the recording is digital in form and, since the index information is readable at lower than video rates, the recording spot-to-spot spacing can be relatively large.

The manner in which the disc is read out depends upon whether the documents are to be displayed visually on a monitor or reproduced on hard copy. In the case of a monitor display, the video disc is read following the arrows shown in FIG. 4. Tracking begins at the vertical blanking interval of field 1 and continues to the beginning of the vertical blanking interval of field 2. During the vertical blanking interval the read spot changes from the outer circular track to the inner circular track and begins reading the stored information along the inner track until the vertical blanking interval for the first field is reached. The read spot then moves back out to the first track and so on.

It will be appreciated that, in a banking environment or the like, since the recording of a disc containing a large number of separate images will likely be done in a central location and done only once, and since the playback of copies of such a disc is likely to be done at a much larger number of dispersed locations, the disc of FIG. 3 is provided with such features as will make playback as simple and reliable as possible (even though it may add complexity to the central recorder). Accordingly an optical vertical synchronizing mark V is provided on the pre-recorded disc, such mark to be read—during both the recording and playback operations—by a stationary photo-electric detector ... the point being that the mark V triggers the recording operation whereby the recorded images are, assuredly and desirably, not randomly distributed about the disc. (A monitor used for displaying disc-recorded images, as is known, can be provided with external vertical sync control and, by detecting the mark V in a copy disc, the monitor display will reliably and quickly lock into vertical sync as the copy disc is brought up to speed. Player drive requirements to get a steady image are thereby relaxed.) In the same way horizontal sync marks h appear on the FIG. 3 disc and are used to trigger each recording of a horizontal line of information, the horizontal marks being additionally used during playback to trigger the horizontal sweep of the display monitor. This, it will be appreciated, will cancel most playback time base error problems.

Pre-recording of vertical and horizontal sync marks—and even tracking information—may be provided either by the disc manufacturer or by use of the central recorder.

In order to properly synchronize the played back information with the standard video display device, it is convenient to rotate the disc such that the frame repetition rate of played-back video information equals the frame repetition rate of the video display device. For the record configuration shown in FIG. 4, this means that the disc should be rotated at 3600 rpm to give a frame repetition rate of 30 per second. This rate of rotation is in contrast to the 1800 rpm rate of the prior art devices shown in FIGS. 1a and 1b.

Although the readout scheme of FIG. 4 may be used if the read-back signal is applied to a printer device capable of printing interlaced fields when the field information is supplied sequentially, most printers are designed to print line-by-line, starting from the top of a document and progressing to the bottom. These printers thus require lines of document information alternately from the two fields, i.e., line 1 from field 1 is printed, then line 2 from field 2, then line 3 from field 1, then line 4 from field 2, and so on. It is necessary to modify the readout scheme described above in order to produce an output signal compatible with such printers. In accordance with the present invention, two beams are used to read out information from the video disc. Both beams may be provided by one laser by means of a beam splitter and mirror arrangement or optical wedge device or grating device. The two read beams are arranged to read both adjacent tracks at the same time; see FIG. 5. It is not necessary to switch either of the read beams back and forth between the circular tracks. This dual beam readout of the video disc D (FIG. 6) produces simultaneously two playback signals, one corresponding to each recorded field of video information. In order to process both signals to provide an output signal which is compatible with a printer device of the type described above, the present invention employs a circuit which is shown in block schematic form in FIG. 6.

Figure 6:
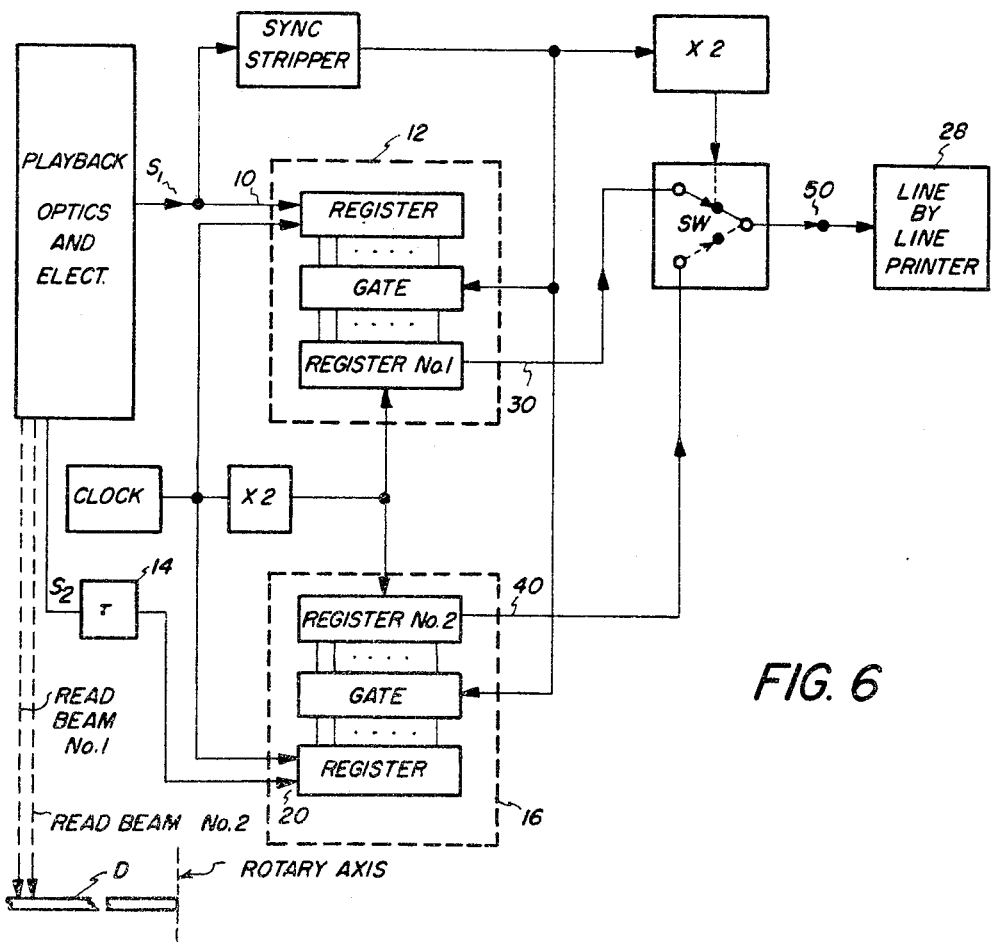
FIG. 6 shows in block schematic form a circuit which transforms the playback signal from a video disc having information stored in accordance with the present invention into a form compatible with a line-by-line printer device.

Referring to FIG. 6, playback signal $S_1$ represents the document information corresponding to field 1 (odd lines) from read beam #1, and playback signal $S_2$ represents the document information signal corresponding to field 2 (even lines) from read beam #2. Playback signal $S_1$ is applied to a terminal 10 of a buffer circuit 12, while playback signal $S_2$ passes through a delay line 14 before being applied to a terminal 20 of a buffer circuit 16. The time delay $\tau$ introduced by the delay line 14 is equal to one-half of the time it takes for an individual field line to be played back. For example, assume the disc rotates at 3600 rpm during playback, and that there are 333 scan lines per disc revolution, the time required to play back one scan line is 50 $\mu$s. The time delay $\tau$ is therefore equal to 25 $\mu$s.

Each of the buffer circuits 12 and 16 is clocked to accept field lines at the rate of one line per 50 $\mu$s. The printer device is thus chosen to print at a rate of one field line per 25 $\mu$s, i.e., at a rate which is twice as fast as the playback rate. (It will be apparent that the numbers chosen above are merely illustrative, and that the disc playback rate can be made faster or slower to be compatible with a particular printer device.)

Figures 7, 8:
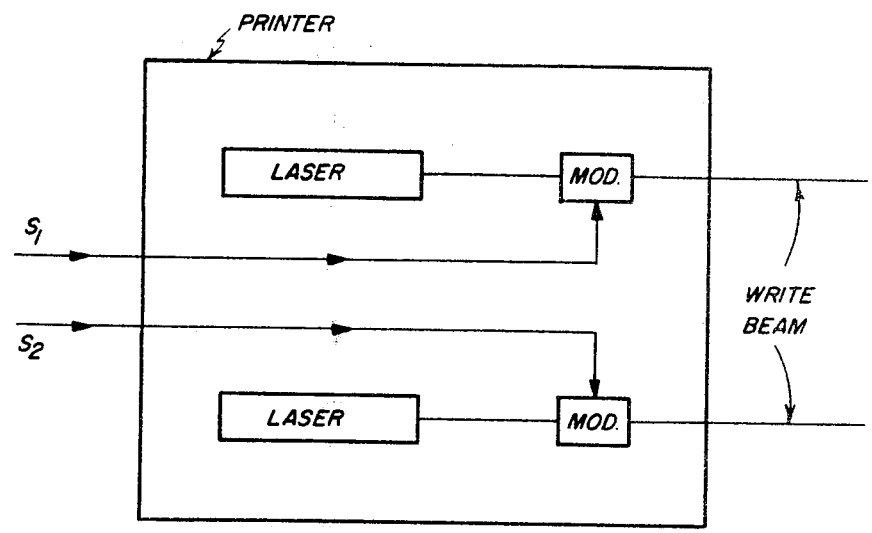
FIG. 7 is a table useful in describing the operation of the circuit of FIG. 6.
FIG. 8 shows a circuit for use with the record format of FIG. 5 and is used to illustrate another embodiment of the present invention useful with a dual line printer device.

Referring now to the table in FIG. 7 (and bearing in mind that lines 1, 2 and 3, 4, etc. are read together), at time $t=0$ to $\tau$, the signal at terminal 10 corresponds to the first half of frame line 1. At $t=\tau$ to $2\tau$, the signal at terminal 20 corresponds to the first half of frame line 2, while terminal 10 sees a signal corresponding to the last half of frame line 1. At time $t=2\tau$ to $3\tau$, the signal corresponding to frame line 3 is applied to terminal 10, while the signal corresponding to the last half of frame line 2 is applied to terminal 20. At time $t=\tau$, the signal corresponding to frame line 1 is gated (by sync) into an output register #1 which "outputs" (x2 clock) the line 1 signal to the output terminal 30 in a time equal to $\tau$. At time $t=3\tau$ to $4\tau$, $4\tau$ to $5\tau$, $5\tau$ to $6\tau$, etc., the signals at the terminals 10, 20, 30 and 40 are as shown in the table. It is important to note that the signals at the buffer circuit output terminals 30 and 40 correspond to the odd and even field lines, respectively, each line signal being fed out in a time equal to $\tau$. A switch SW switches between terminals 30 and 40 to provide a line sequential output signal $S_o$ which is fed to a line-by-line printer device 28, the switch SW being for example an electronic switch which is toggled by means of an index pulse produced at twice the sync rate. The output signal $S_o$ is comprised of lines of information alternately from the two fields (line 1, line 2, line 3, line 4 . . .) and is therefore compatible with line-by-line printer devices.

FIG. 8 shows an alternate embodiment of the invention which is useful in connection with a dual beam printer, i.e. a printer wherein a pair of lines are printed simultaneously. The disc is read out with a dual beam playback system as described in connection with FIG. 5, the tracking of the two beams being identical. The two playback signals $S_1$ and $S_2$ are directly applied to the dual beam printer device. Each of the playback signals $S_1$ and $S_2$ modulates a respective laser beam to simultaneously record document information from both recorded fields. In this manner, the printer prints lines 1 and 2, lines 3 and 4, lines 5 and 6 . . . starting at the top of the page and progressing to the bottom.

The invention has been described in detail with particular reference to preferred embodiments thereof, but it will be understood that variations and modifications can be effected within the spirit and scope of the invention.

What is claimed is:

1. For use in producing a print of video information stored on a video disc adapted for rotation about a centrally disposed axis, said disc being of the type having video frames of two interlaced fields per frame stored thereon, each field of a frame corresponding to a track of said disc, said fields being comprised of line signals, and said tracks extending approximately 360° about the rotary axis of said disc, apparatus comprising:
   (a) means for simultaneously playing back both fields of a recorded frame on said disc to produce signals corresponding to said fields;
   (b) first and second buffer means for receiving respectively the line signals corresponding to said fields;
   (c) a printer of the type adapted to receive a serial stream of signals to produce therefrom line-by-line a print corresponding to its received signals; and
   (d) means cooperative with said printer for alternately applying the line signals of said first and second buffer means to said printer.

2. The apparatus of claim 1 wherein said first and second buffer means are respectively adapted to receive signals at a first rate, and to apply said signals to said printer at a second higher rate.

3. The apparatus of claim 1 including:
   (a) means for providing a time delay between the signals produced while simultaneously playing back the fields of a frame; and
   (b) means cooperative with said means for alternately applying signals to said printer for corresponding such period of alternation to the duration of said time delay.

4. For use in producing a print of video information stored on an optical disc adapted for rotation about a centrally disposed axis, said disc being of the type having video frames of two interlaced fields per frame stored thereon, each field of a frame corresponding to a track of said disc, said fields being comprised of line signals, and said tracks extending approximately 360° about the rotary axis of said disc, apparatus comprising:
   (a) means for providing first and second laser beams adapted for simultaneous play back of both fields of a recorded frame on said disc;
   (b) means for receiving said first and second laser beams after they have interacted with said disc, thereby to produce signals corresponding to said fields;
   (c) first and second buffer means for receiving respectively the line signals corresponding to said fields;
   (d) a printer of the type adapted to receive a serial stream of signals to produce therefrom line-by-line a print corresponding to its received signals; and
   (e) means cooperative with said printer for alternately applying the line signals of said first and second buffer means to said printer.

5. The apparatus of claim 4 wherein said first and second buffer means are respectively adapted to receive signals at a first rate, and to apply said signals to said printer at a second higher rate.

6. The apparatus of claim 4 including:
   (a) means for providing a time delay between the signals produced while simultaneously playing back the fields of a frame; and
   (b) means cooperative with said means for alternately applying line signals to said printer for corresponding such period of alternation to the duration of said time delay.

* * * * *